United States Patent [19]

Lee

[11] Patent Number: 5,721,675

[45] Date of Patent: Feb. 24, 1998

[54] POWER SUPPLY CONVERTING CIRCUIT

[75] Inventor: Geon-Gook Lee, Kwang-Ju, Rep. of Korea

[73] Assignee: Daewoo Electronics Co. Ltd., Seoul, Rep. of Korea

[21] Appl. No.: 681,503

[22] Filed: Jul. 23, 1996

[30] Foreign Application Priority Data

Jul. 24, 1995 [KR] Rep. of Korea .................. 95-21884

[51] Int. Cl.⁶ ........................................... H01K 1/00
[52] U.S. Cl. ........................................... 363/44
[58] Field of Search ..................... 363/20–21, 55–56, 363/97–98, 131–132

[56] References Cited

U.S. PATENT DOCUMENTS

4,870,554  9/1989  Smith ........................................ 363/20

*Primary Examiner*—Aditya Krishnan
*Attorney, Agent, or Firm*—Foley & Lardner

[57] ABSTRACT

A power supply converting circuit for eliminating abnormal voltage components, such as an electrical noise component and a surge component, from the commercial alternating current without a transformer and for converting the commercial alternating current into a weak direct current and/or an alternating current having a low voltage to apply the weak direct current and/or the alternating current having a low voltage to a load. A filter filters the commercial alternating current and is connected to main power transmission live lines of the commercial alternating current power. A power level adjusting section receives the filtered alternating current in the filter to convert a power level of the received alternating current. A snubber circuit receives the power level converted alternating current in the power level adjusting section and eliminates the abnormal voltage components of the power level-converted alternating current. A converting section receives the alternating current from which the abnormal voltage components have been eliminated in the snubber circuit and converts a direct current and/or an alternating current having a different level.

6 Claims, 7 Drawing Sheets

POWER SUPPLY CONVERTING CIRCUIT

BACKGROUND OF THE INVENTION

1. Field of the Invention

The present invention relates to a power supply converting circuit, more particularly to a power supply converting circuit for eliminating abnormal voltage components such as an electrical noise component and a surge component included in a commercial alternating current power without a transformer, and for converting the commercial alternating current power into a weak direct current and/or a low level alternating current to be supplied a load.

2. Description of the Prior Art

In general, a commercial alternating current power in the range of 110V to 240V is used as a driving power for electronic equipment or industrial facilities. The commercial alternating current power, which is supplied to the electronic equipment or the industrial facilities, is converted into a direct current and/or a constant level alternating current by power supply converting equipment. The direct current supplied from the power supply converting equipment is applied to a controlling device and the alternating current transformed to have a constant level is applied to a driving power of load.

Figure 1:
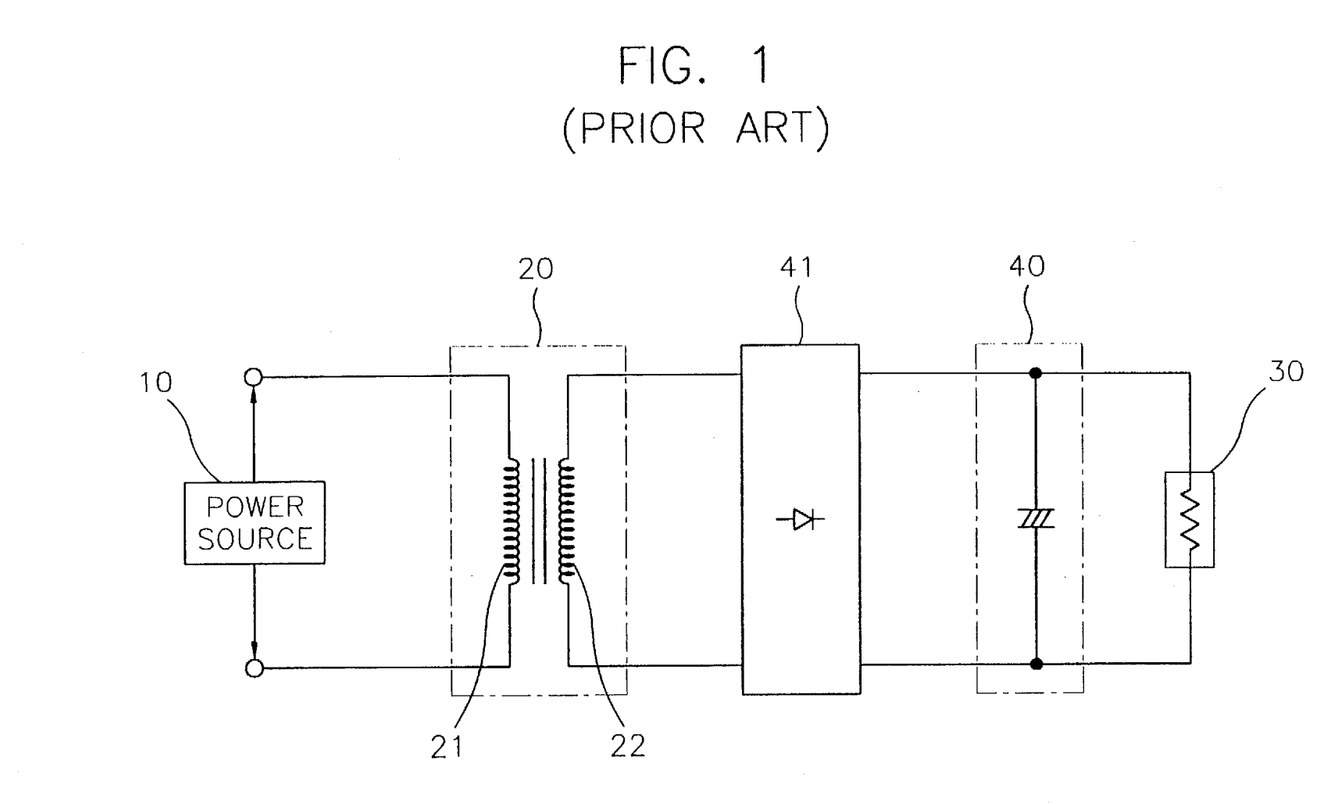
FIG. 1 is a circuit diagram for showing a conventional power supply converting circuit which uses a transformer.

FIG. 1 is a circuit diagram of a transformer type power supply converting circuit for converting a power level according to a turn ratio of winding in the transformer to generate a converted power level. Referring to FIG. 1, the operation of the power supply converting circuit which converts the commercial alternating current into the direct current having constant level, will be described as follows.

As shown in FIG. 1, a power source 10 for supplying the commercial alternating current is connected to a primary winding coil 21 of transformer 20, and a load section 30 is connected to a secondary winding coil 22 of transformer 20. Transformer 20 having primary winding coil 21 and secondary winding coil 22 inductively combines power source 10 with load section 30. Therefore, the commercial alternating current, which flows into primary winding coil 21 of transformer 20, is converted into the constant level alternating current according to the turn ratio of transformer 20 and then the converted alternating current is applied to load section 30 connected to secondary winding coil 22 of transformer 20. A rectifying and smoothing section 40 is connected between transformer 20 and load section 30 to rectify the level converted alternating current, and to smooth the level converted alternating current. A rectifier 41 having a bridge-diode is connected to a front section, of the load section which requires a direct current, so rectifier 41 converts the alternating current into the direct current.

The above-mentioned conventional power supply converting circuit, which has the transformer therein, converts the commercial alternating current power into the constant level direct current or the constant level alternating current according to the turn ratio of the transformer. The commercial alternating current applied to the primary winding coil of the transformer is converted into the constant level alternating current according to the turn ratio of the transformer and then the converted alternating current is generated from the secondary winding coil of the transformer. The alternating current generated from the secondary winding coil of the transformer is applied to a rectifying and smoothing section, so an electrical noise component or an electrically impulsive surge component in the commercial alternating current is reduced by a hysteresis characteristic of the transformer, and then the alternating current is applied to the load section, or converted into the direct current through the bridge-diode to be applied to the load section.

As it is described above, an example of the power supply converting circuit for supplying the load with the alternating current after the level of the alternating current is converted according to the turn ratio of the transformer, is disclosed in U.S. Pat. No. 4,906,901 (issued to David T. Carroll).

In the conventional power supply converting circuit having the above-mentioned construction, the size of the power supply converting circuit may not be reduced because of a precise controlling of the ratios of the primary and the secondary winding coils in the transformer and the cost for the power supply converting circuit is increased. Also, a noise is generated from the power supply converting circuit due to a magnetic vibration around a core, which is installed in the transformer therein, and additional transformers are needed according to the load section.

Figure 2:
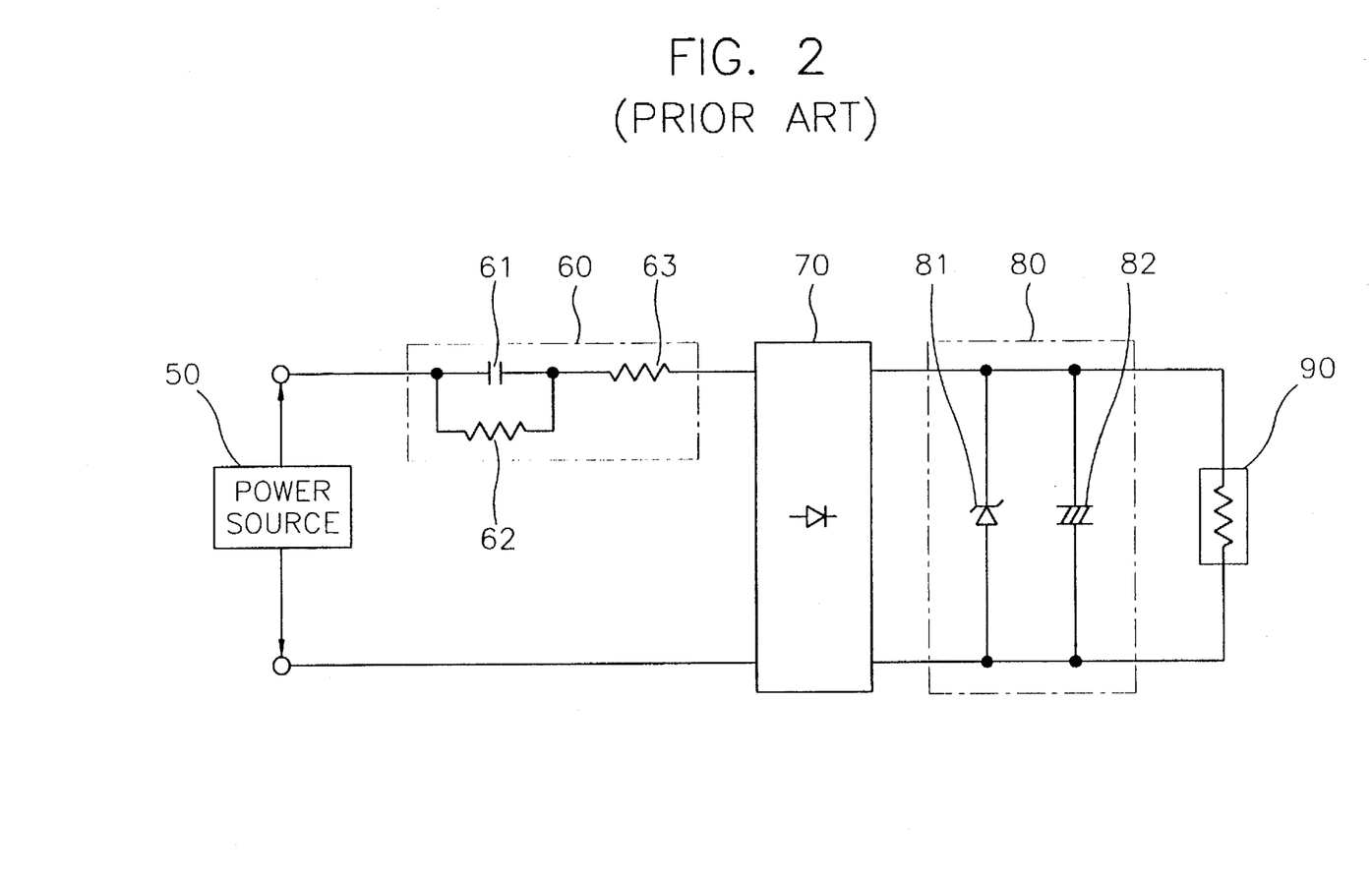
FIG. 2 is a circuit diagram for showing a conventional power supply converting circuit without a transformer.

FIG. 2 is a circuit diagram for showing a power supply converting circuit for converting the commercial alternating current power into the direct current without a transformer. As shown in FIG. 2, a snubber circuit 60 is connected to an output side of power source 50. A capacitor 61 and a first resistor 62 are connected in parallel to snubber circuit 60, and a second resistor 63 is serially connected to capacitor 61 to form a discharging path of capacitor 61. Snubber circuit 60 defines the level of the commercial alternating current supplied from power source 50. A rectifier 70 is connected to an output side of snubber circuit 60. A smoothing section 80 is connected to an output side of rectifier 60. Smoothing section 80 has a zenor diode 81 and a capacitor 82 connected to the output ends of rectifier 70. Smoothing section 80 adjusts the rated voltage of the power, which has been converted into direct current level, and smoothes the rated voltage of the power to apply the rated voltage to load section 90.

In above-mentioned a power supply converting circuit without the transformer, when the commercial alternating current power is applied to the capacitor and the resistor, the commercial alternating current is reduced, and then the power of the commercial alternating current is also reduced so that the level of the commercial alternating current is converted. Namely, the current of the commercial alternating current power I is defined as $I=V/2\pi \times f \times C+R$, and the electric power P is defined as $P=V \times I$. Hence, if the current level of the alternating current power is adjusted by capacitor 61 and first resistor 62, the level of electric power is changed. The level of the alternating current is changed by capacitor 61 and first resistor 62 and rectified in rectifier 70 and then changed into the direct level current. The power of the direct level current is adjusted to have a fixed voltage by the rated voltage of zenor diode 81, and then is smoothed in capacitor 82 to be applied to load 90.

The non-transformer type power supply converting circuit has an advantage that the total operating area is reduced because the non-transformer type power supply converting circuit does not have a transformer, but the non-transformer type power supply converting circuit cannot remove the electrical noise component and/or the surge component included in the commercial alternating current therein. Therefore, in the non-transformer type power supply converting circuit, the load may be received as an electrical impulse because abnormal voltage components which are included in the commercial alternating current are applied to the load.

SUMMARY OF THE INVENTION

Therefore, it is an object of the present invention to provide a power supply converting circuit for eliminating abnormal voltage components, such as an electrical noise component and a surge component, from the commercial alternating current without a transformer and for converting the commercial alternating current into a weak direct current and/or an alternating current having a low voltage to apply the weak direct current and/or the alternating current having a low voltage to a load.

To achieve the above object of the present invention, the power supply converting circuit has a filter for filtering the commercial alternating current. The filter is connected to a main power transmission live line of the commercial alternating current power. Further, the power supply converting circuit has a power level adjusting means which receives the filtered alternating current in the filter to convert a power level of the received alternating current, a snubber circuit that receives the power level converted alternating current in the power level adjusting means to eliminate the abnormal voltage components of the power level-converted alternating current, and a converting means, which receives the alternating current whose abnormal voltage components are eliminated in the snubber circuit to convert a direct current and/or an alternating current having a different level.

In the power level adjusting means connected to the live lines, a capacitor and a resistor have a parallel relation and the power level adjusting means has a discharging resistor which is serially connected to the capacitor and the resistor. In the snubber circuit connected between the live lines, a capacitor and a resistor are serially connected between the live lines.

According to a first embodiment of the present invention, the converting means, for example, has a rectifying means for receiving the commercial alternating current, which is outputted from the snubber circuit, to convert the received commercial alternating current into a direct level current and a smoothing means for adjusting, as well as, smoothing a direct rated voltage outputted from the rectifying means. The smoothing means, which has a zenor diode for adjusting a predetermined rated voltage, and a smoothing capacitor, which has a parallel relation between the live lines, are connected at the rear side of the rectifying means.

According to a second embodiment of the present invention, the converting means further includes an alternating power converting section for receiving the alternating current outputted from the snubber circuit to form a path concerning two power periods of the positive direction and the negative direction so that the inputted alternating current is converted into a constant level alternating current.

The alternating power converting section has, for example, first and second zenor diodes connected in parallel in a reverse direction to each other between the live lines at a rear terminal of a pair of voltage dividing resistors, which are connected to divided live lines from the snubber circuit, and first and second current limiting resistors, which are serially connected between subsequent live lines to output a reference voltage at the junction point of the first and second current limiting resistors. In this case, a reference voltage is generated from the junction point of the first current limiting resistor and the second current limiting resistor. Further, the alternating power converting section includes a pair of voltage dividing resistors connected to divided live lines from the snubber circuit, a first pair of zenor diodes comprised of first and second zenor diodes, and a second pair of zenor diodes comprised of third and fourth zenor diodes. The first pair of zenor diodes and the second pair of zenor diodes are connected in parallel. with each other in a reverse direction between the live lines at a rear terminal of the voltage dividing resistors and a first junction point of the first and second zenor diodes and a second junction point of the third and fourth zenor diodes are commonly connected with each other so as to generate a reference voltage.

Preferably, the converting means has a rectifying means for receiving the commercial alternating current outputted from the power level adjusting means, and converting the received commercial alternating current into a direct current, to apply the direct current to the snubber circuit; and a smoothing means for adjusting and smoothing a direct rated voltage outputted from the snubber circuit. Here, the smoothing means includes a zenor diode and a smoothing capacitor for adjusting and smoothing the direct rated voltage, the zenor diode and the smoothing capacitor connected in parallel with each other between the live lines at a rear terminal of the snubber circuit.

Preferably, the converting means is an alternating power converting section for receiving the alternating current outputted from the snubber circuit and forming a path of positive and negative directions of the alternating current to convert the received alternating current into a constant level alternating current. At this time, the alternating power converting section includes a first pair of zenor diodes composed of first and second zenor diodes, and a second pair of zenor diodes composed of third and fourth zenor diodes. The first pair of zenor diodes and the second pair of zenor diodes are connected in parallel with each other in the reverse direction between the live lines at a rear terminal of the snubber circuit and a first junction point of the first and second zenor diodes and a second junction point of the third and fourth zenor diodes are commonly connected to generate a reference voltage.

More preferably, the filter is comprised of a choke coil.

The filter, which filters the electrical noise components from a commercial alternating current power, is connected to the power source. The power level adjusting section that defines the current level of the filtered alternating current is connected to the filter. The snubber circuit that removes the abnormal voltage components, such as the electrical noise component and the surge component in the alternating current power, is connected to the rear section of the power level adjusting section. The power changing section is connected to the output side of the snubber circuit. The power changing section outputs the direct current and/or the different level alternating current according to necessity. The power changing section to output the alternating current is connected to the output side of the power level adjusting section and switches the paths of the positive and the negative periods of the level adjusted alternating current. The power changing section to output the direct current has a rectifier that outputs the direct current at a regular level and a smoothing section that smoothes the direct current.

The commercial alternating current generated from the power source is inputted into the filter through the transmission live lines. The filter filters off the electrical noise component which is a ripple wave in the commercial alternating current power. The noise filtered current through the filter is supplied to the power level adjusting section so that the power level of the commercial alternating current is adjusted according to the load. The power level adjusted current outputted from the power level adjusting section is supplied to the snubber circuit. The snubber circuit applies the current in which the abnormal voltage components, such as the electrical noise component, and the surge component are removed to the power changing section. The power changing section changes the alternating current into direct current and/or the different level alternating current according to the necessity so as to apply this to the load.

The power supply converting circuit according to the present invention increases the reliability of the power supply converting circuit since the abnormal voltage components, such as an electrical noise component, and a surge component are eliminated from the commercial alternating current without using a transformer and the size of the power supply converting circuit can be smaller and the weight thereof can be reduced.

BRIEF DESCRIPTION OF THE DRAWINGS

The above object and other advantages of the present invention will become more apparent by describing in detail the preferred embodiments of the present invention with reference to the attached drawings, in which.

DESCRIPTION OF THE PREFERRED EMBODIMENT

A description will be given below in detail of the constructions and operations of the power supply converting circuit according to the embodiments of the present invention with reference to the accompanying drawings.

Embodiment 1

Figure 3:
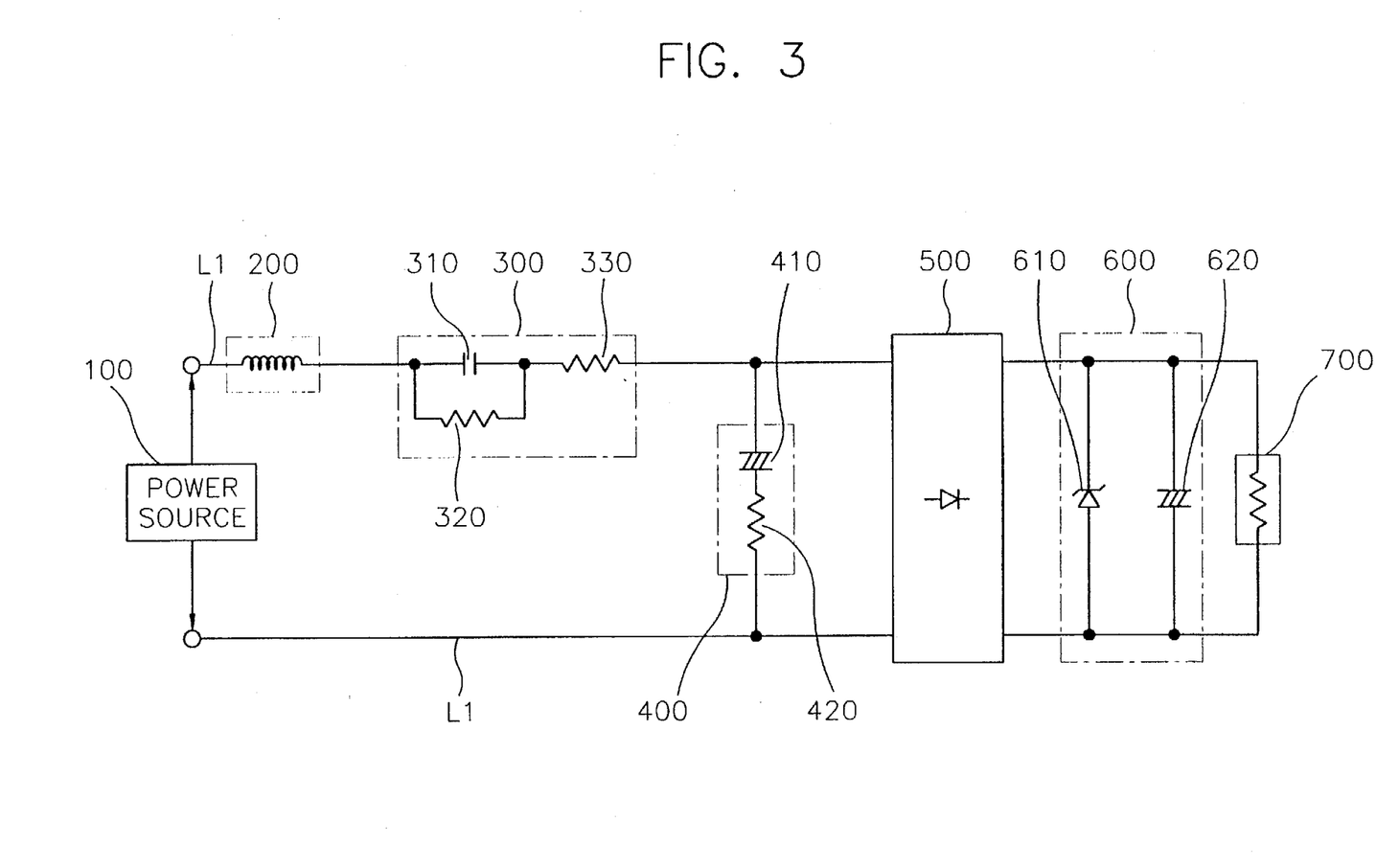
FIG. 3 is a circuit diagram for showing a power supply converting circuit according to a first embodiment of the present invention.

FIG. 3 is a circuit diagram for showing a power supply converting circuit according to a first embodiment of the present invention. As shown in FIG. 3, in the power supply converting circuit of the present embodiment, a choke-input filter 200 which includes a choke coil L is connected to main power transmission live lines L1 of the commercial alternating current. A power level adjusting section 300 which includes a current limiting capacitor 310, a current limiting resistor 320 and a discharging resistor 330, is serially connected to an output side of filter 200. Current limiting capacitor 310 and current limiting resistor 320 are in parallel connected in parallel to an output side of filter 200. Discharging resistor 330 is serially connected to current limiting capacitor 310 and current limiting resistor 320 to form a discharging path of current limiting capacitor 310. A snubber circuit 400, which includes a snubber capacitor 410 and a snubber resistor 420 serially connected between the live lines L1, is connected to an output side of power level adjusting section 300. A rectifier 500 is connected between the live lines L1 of the output side of snubber circuit 400. A smoothing section 600 is connected to an output side of rectifier 500. Smoothing section 600 has a zenor diode 610, which not only outputs a constant rated voltage but also smoothes the constant rated voltage, and a smoothing capacitor 620. Zenor diode 610 and smoothing capacitor 620 are connected in parallel between live lines L1. A first load 700 driven by a direct current is connected to an output side of smoothing section 600.

In the above-described power supply converting circuit according to the present embodiment, the commercial alternating current supplied from a power source 100 is applied to choke-input filter 200 so that an electrical noise is filtered. The noise filtered commercial alternating current is applied to power level adjusting section 300. Power level adjusting section 300 changes the level of the commercial alternating current by the operations of current limiting capacitor 310 and current limiting resistor 320. That is, the current of the commercial alternating current I is $I=V/2\pi \times f \times C+R$, the electric power of the commercial alternating current P is $P=V\times I$. When the current level of the alternating current is adjusted by current limiting capacitor 310 and current limiting resistor 320, the power level of the alternating current is changed. The level changed alternating current is applied to snubber circuit 400. Snubber circuit 400 includes capacitor 410 and resistor 420 serially connected to eliminate the abnormal voltage components such as the electrical noise component and the surge component, from the commercial alternating current. The commercial alternating current from which the abnormal voltage components are eliminated is applied to rectifier 500. Rectifier 500 rectifies the level adjusted alternating current by a rectifying element or a rectifying diode, to convert into the constant level direct current. The direct current converted in rectifier 500 is applied to smoothing section 600 having zenor diode 610 and capacitor 620. The voltage level of the direct current applied to smoothing section 600 is adjusted by the operation of zenor diode 610, then the direct current is smoothed by the operation of capacitor 620, and then the direct current is applied to first load 700 such as a controlling circuit of the electronic equipment which demands the direct current.

In the power supply converting circuit according to the present embodiment, the commercial alternating current eliminated the abnormal voltage components such as the electrical noise component and the surge component, is applied to the load. Therefore, since a transformer is not used, the reliability of the power supply converting circuit may be increased, the size of the power supply converting circuit can be smaller, and the weight of the power supply converting circuit can be reduced.

Embodiment 2

Figure 4:
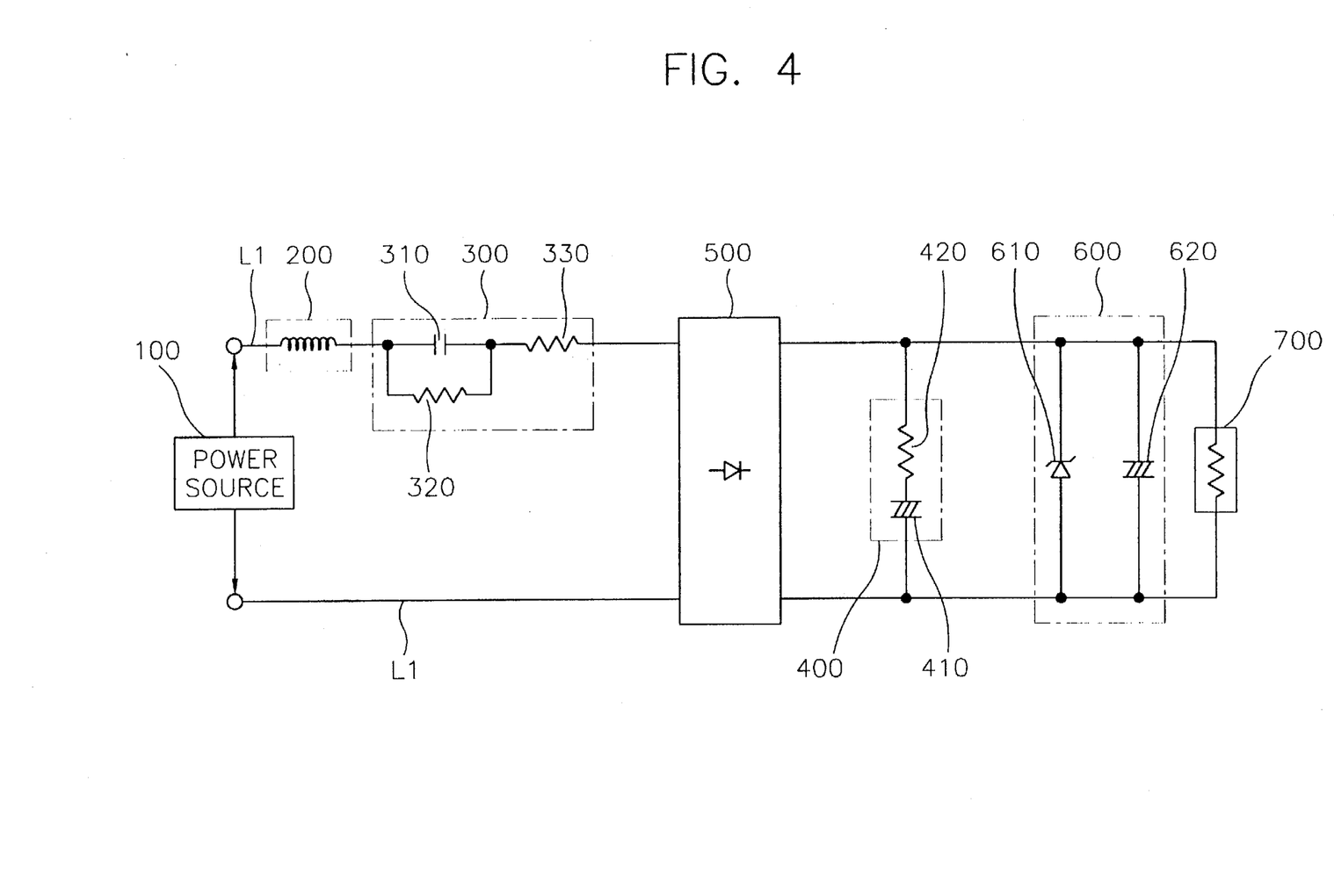
FIG. 4 is a circuit diagram for showing a power supply converting circuit according to a second embodiment of the present invention.

FIG. 4 is a circuit diagram for showing a power supply converting circuit according to a second embodiment of the present invention. In FIG. 4, the same reference numerals are used concerning the same elements in FIG. 3. The power supply converting circuit of the present embodiment is the same as the power supply converting circuit of the first embodiment except that snubber circuit 400 is connected to a rear section of rectifier 500.

Namely, in the first embodiment, snubber circuit 400 is connected to a front section of rectifier 500. Therefore, the commercial alternating current is directly applied to snubber circuit 400 in the first embodiment. Snubber circuit 400 demands a large capacity capacitor for eliminating the abnormal voltage components such as the electrical noise component, and/or the surge component from the commercial alternating current. However, in the present embodiment as shown in FIG. 4, snubber circuit 400 is connected to the rear section of rectifier 500. Instead of the commercial alternating current, the direct current primarily rectified in rectifier 500 is applied to snubber circuit 400. The abnormal voltage components, such as the electrical noise component and the surge component, in the rectified direct current outputted from rectifier 500 are much smaller than those of the commercial alternating current therein.

In the present embodiment, rectifier 500 possibly receives the electrical impulse because the abnormal voltage components, such as the electrical noise component and the surge component, in the commercial alternating current are partially eliminated. However, the smaller capacity of the capacitor in snubber circuit 400 can be used. Thus, the present embodiment has an advantage from the view of economy.

Embodiment 3

Figure 5:
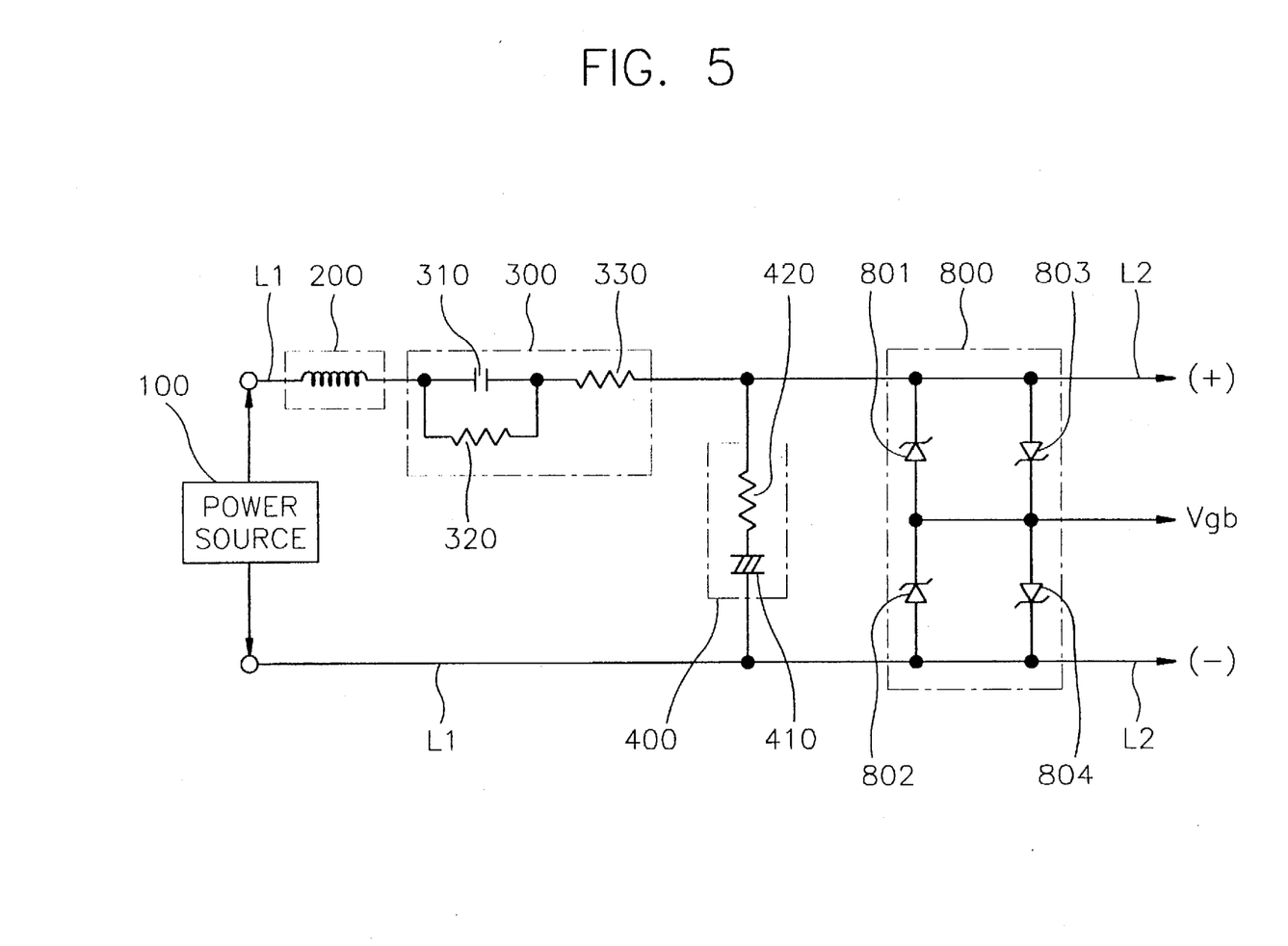
FIG. 5 is a circuit diagram for showing a power supply converting circuit according to a third embodiment of the present invention.

FIG. 5 is a circuit diagram for showing a power supply converting circuit according to a third embodiment of the present invention. In FIG. 5, the same reference numerals are used concerning the same elements in FIG. 3. The power supply converting circuit according to the present embodiment is the same as the power supply converting circuit of the first embodiment except that an alternating current power changing section 800 is connected to the output side of snubber circuit 400 instead of rectifier 500 and smoothing section 600.

In the present embodiment, alternating current power changing section 800 is connected to the output side of snubber circuit 400. Alternating current power changing section 800 receives the commercial alternating current to output an alternating current having a low level voltage. Alternating current power changing section 800 includes first and second zenor diodes 801 and 802 serially connected between the live lines L1 and third and fourth zenor diodes 803 and 804 which are serially connected between the live lines L1 in the opposite direction of first and second zenor diodes 801 and 802. The junction point of first and second zenor diodes 801 and 802 and the junction point of third and fourth zenor diodes 803 and 804 are commonly connected. A reference voltage needed for the operation of the load is generated from the junction points of zenor diodes 801, 802, 803 and 804 and the alternating current converted into the constant level alternating current is outputted through the live lines L1. For example, the reference voltage outputted from the junction points of zenor diodes 801, 802, 803 and 804 is used as a grid bias power Vgb used for an operation basis of the fluorescent display tube and the alternating current outputted from the live lines L1 is used for the operation of the heater in the fluorescent display tube.

In the above-mentioned power supply converting circuit of the present embodiment, the operation that the alternating current generated from a power source 100 is applied to snubber circuit 400, is the same as in the operation of the first embodiment. The alternating current in which the abnormal components are eliminated in snubber circuit 400 is applied to alternating current power changing section 800. First and second zenor diodes 801 and 802 together form a path of the alternating current in the positive (+) period of the alternating current, and third and fourth zenor diodes 803 and 804 together form a path of the alternating current in the negative (−) period of the alternating current. Thus, the alternating current, which has a constant level, is outputted through both ends of live lines L2. Further, the reference voltage Vgb, which has a constant level, is generated from a common junction point of first zenor diode 801, second zenor diode 802, third zenor diode 803 and fourth zenor diode 804. Therefore, alternating current power changing section 800 outputs the alternating current suitable for operating the load of the fluorescent display tube for displaying the operating state of the electronic equipment.

The power supply converting circuit of the present embodiment removes the abnormal voltage components, such as the electrical noise component and the surge component, from the commercial alternating current without a transformer, and changes the level of alternating current according to the load so as to apply the level changed alternating current to the load.

Embodiment 4

Figure 6:
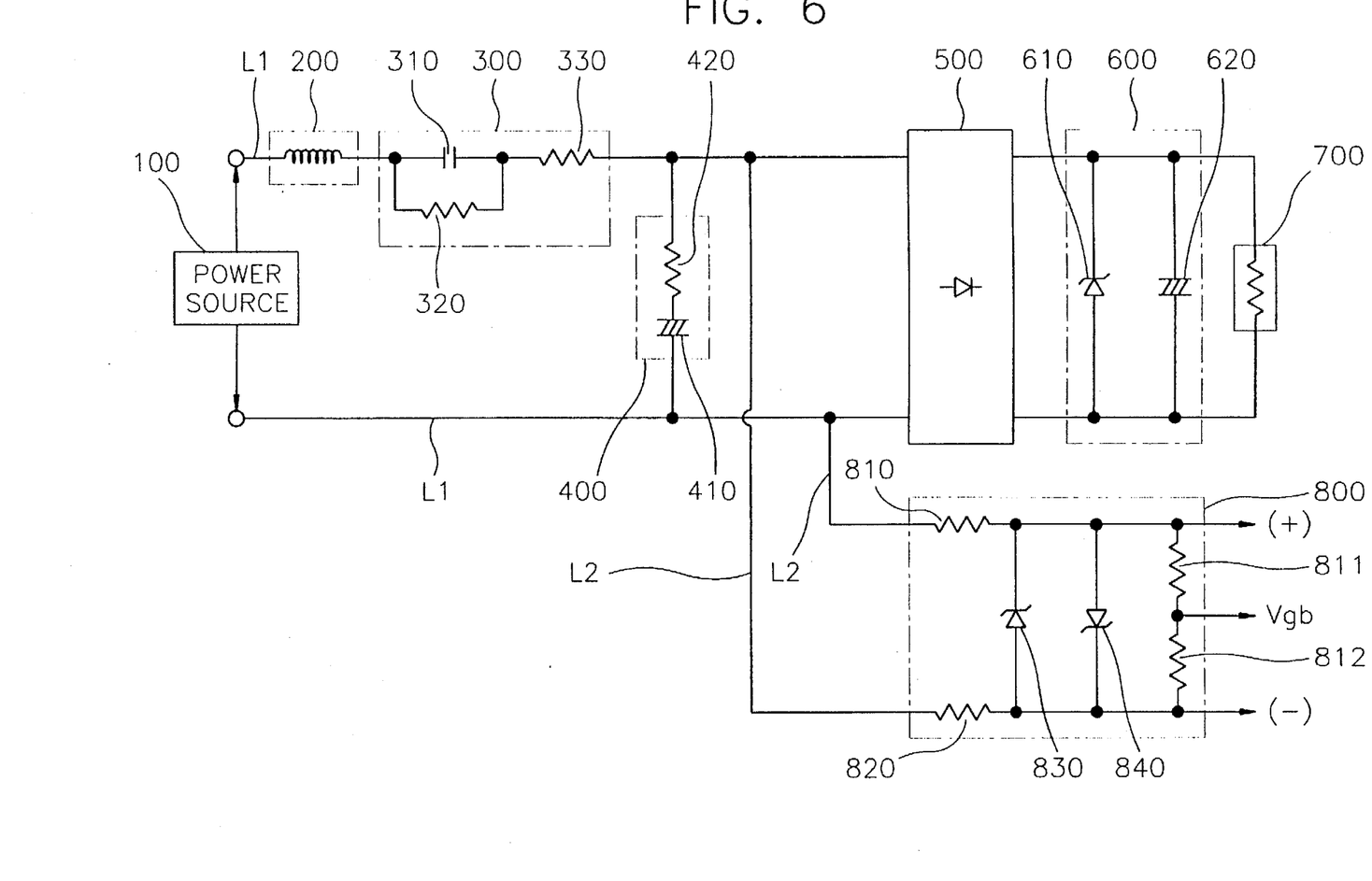
FIG. 6 is a circuit diagram for showing a power supply converting circuit according to a fourth embodiment of the present invention.

FIG. 6 is a circuit diagram for showing a power supply converting circuit according to a fourth embodiment of the present invention. In FIG. 6, the same reference numerals are used concerning the same elements in FIG. 3. The power supply converting circuit according to the present embodiment includes an alternating current power changing section 800, which is parallel with rectifier 500, between snubber circuit 400 and rectifier 500 in the power supply converting circuit of the first embodiment.

In the power supply converting circuit according to the present embodiment, rectifier 500 and alternating current power changing section 800 are connected to the output side of snubber circuit 400. Alternating current power changing section 800 has first and second voltage dividing resistors 810 and 820 respectively connected to two live lines L2 divided from the output side of snubber circuit 800 and first and second zenor diodes 830 and 840 connected in parallel between the live line L2 at the rear sections of first and second voltage dividing resistors 810 and 820. First and second zenor diodes 830 and 840 are connected in reverse direction between the live lines L2. First and second current limiting resistors 811 and 812 are serially connected between the live lines L2 at the rear section of first and second zenor diodes 830 and 840 and the junction point of first and second current limiting resistors 811 and 812 are commonly connected.

In the above-described power supply converting circuit of the present embodiment, the operation that the alternating current generated from power source 100 applied to snubber circuit 400 is the same as the operation of the first embodiment. The alternating current in which the abnormal components are eliminated in snubber circuit 400 is applied to rectifier 500 and alternating current power changing section 800. The alternating current applied to rectifier 500 is rectified by a rectifying element or a rectifying diode so that it is changed into a direct current having a constant level. The direct current outputted from rectifier 500 is applied to smoothing section 600 which includes a zenor diode 610 and capacitor 620. The voltage level of the direct current applied to smoothing section 600 is adjusted by the operation of zenor diode 610, the direct current is smoothed by the operation of capacitor 620, and the direct current is applied to a first load 700 such as a controlling circuit of the electronic equipment.

Also, the alternating current applied to alternating current power changing section 800 diverged from the output side of snubber circuit 800 through live lines L2 is applied to first and second voltage dividing resistors 810 and 820 which are respectively connected to the live lines L2. First and second voltage dividing resistors 810 and 820 stabilize the electric potential of the voltage which is changed into the direct level by rectifier 500. Therefore, the power supply converting circuit according to fourth embodiment changes the alternating current into the constant level alternating current in alternating current power changing section 800 without affecting the electric potential of the voltage changed into the direct current level by rectifier 500. First zenor diode 830 connected at the rear section of first and second voltage dividing resistors 810 and 820 and second zenor diode 840 which is connected in the reverse direction of first zenor diodes 830, together, form the power path of the alternating current. The alternating current changed into the constant level alternating current in first zenor diode 830 and second zenor diode 840 is outputted through the live lines L2. The reference voltage Vgb, which has a constant level, is outputted from the junction point of first and second current limiting resistors 811 and 812 which are connected to the rear section of first and second zenor diodes 830 and 840.

The power supply converting circuit according to the present embodiment, removes the abnormal voltage components, such as the electrical noise component and the surge component, from in the commercial alternating current without a transformer and changes the commercial alternating current into the level changed alternating current and/or the direct current according to the load so that the level changed alternating current and/or the direct current is/are applied to the load.

Embodiment 5

Figure 7:
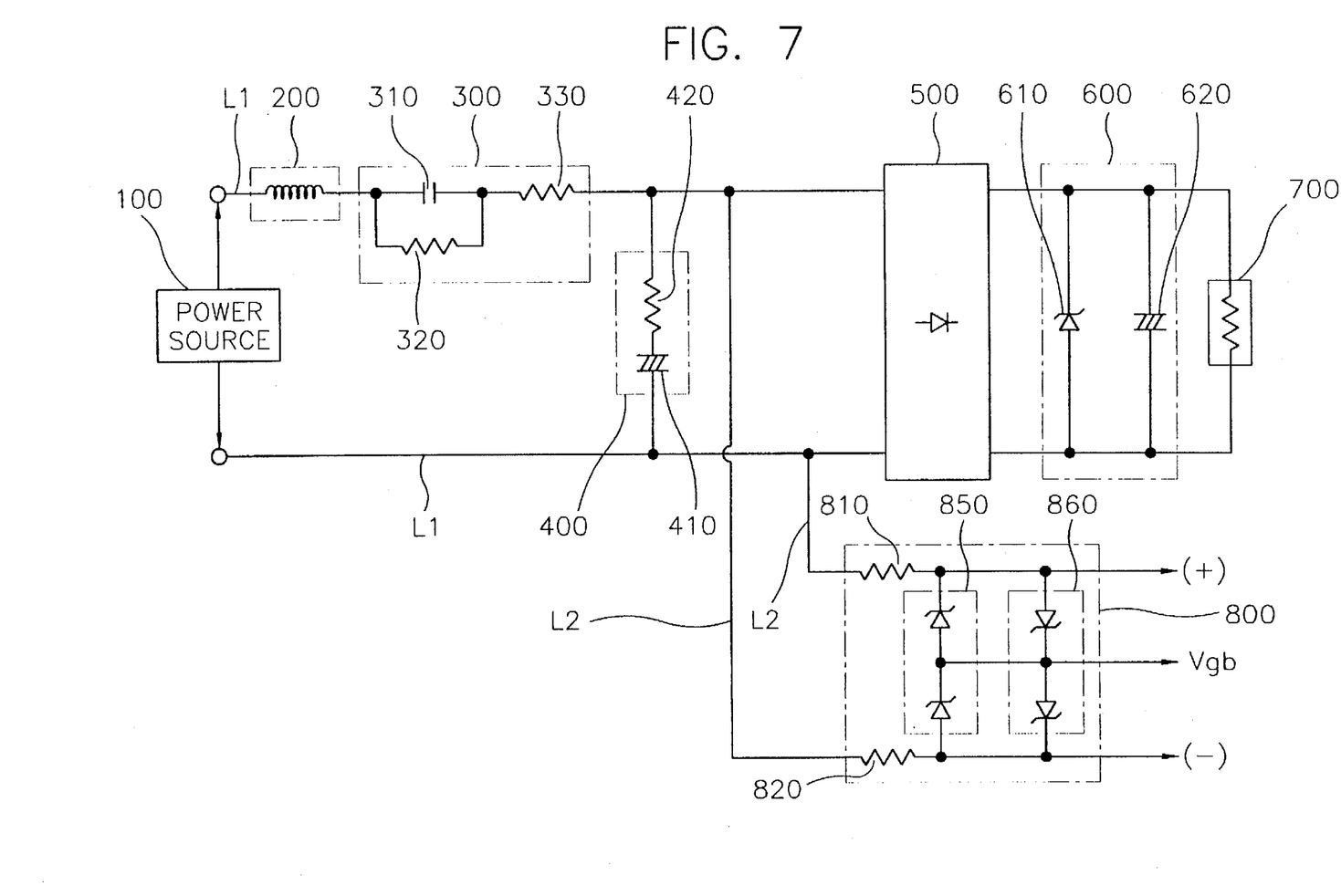
FIG. 7 is a circuit diagram for showing a power supply converting circuit according to a fifth embodiment of the present invention.

FIG. 7 is a circuit diagram for showing a power supply converting circuit according to the fifth embodiment of the present invention. In FIG. 7, the same reference numerals are used concerning the same elements in FIG. 3. The power supply converting circuit according to the present embodiment has the same construction of the power supply converting circuit of the fourth embodiment except for alternating current power changing section 800. Alternating current power changing section 800 of the present embodiment has a construction such that first and second voltage dividing resistors 810 and 820 are respectively connected to two live lines L2 diverged from the output side of snubber circuit 800, and a first pair of zenor diodes 850 is serially connected between the live lines L2 at the rear section of first and second voltage dividing resistors 810 and 820. A second pair of zenor diodes 860 is connected between the live lines L2 in the reverse direction of the first pair of zenor diodes 850. The junction points of the first pair of zenor diodes 830 and the second pair of zenor diode 840 are commonly connected. The operation of the power supply converting circuit according to the present embodiment is the same as the operation of the fourth embodiment.

As it is described above, the power supply converting circuit according to the present invention removes the abnormal voltage components such as the electrical noise component and the surge component, from the commercial alternating current power without a transformer and converts the commercial alternating current power into the direct current and/or the constant level alternating current to supply a load with the direct current and/or the constant level alternating current. Therefore, the reliability of the power supply converting circuit is increased, and the power supply converting circuit can have smaller size and lighter weight since the direct current as well as the level adjusted alternating current can be supplied.

It is understood that various other modifications will be apparent to and can be readily made by those skilled in the art without departing from the scope and spirit of this invention. Accordingly, it is not intended that the scope of the claims appended thereto be limited to the description as set forth herein, but rather that the claims be constructed as encompassing all the features of the patentable novelty that reside in the present invention, including all the features that would be treated as equivalents thereof by those skilled in the art to which this pertains.

What is claimed is:

1. A circuit for converting power supply, which comprises:

a filter for faltering a commercial alternating current, said filter being connected to main transmission live lines of a commercial alternating current power and having a choke coil;

a power level adjusting means for receiving the filtered alternating current from said filter, to convert a power level of the received alternating current, said power level adjusting means having an current limiting capacitor and an adjusting resistor, which have a parallel relation with each other and are connected to the live lines, and a discharging resistor serially connected to the capacitor and the resistor;

a snubber circuit for receiving the power level converted alternating current from said power level adjusting means, to eliminate abnormal voltage components of the power level converted alternating current, said snubber circuit having a snubber capacitor and a snubber resistor which, are serially connected between the live line;

a rectifying means for receiving the alternating current wherein the abnormal voltage components are removed in said snubber circuit, to convert the alternating current into a direct current having a constant level; and a smoothing means for adjusting and smoothing a direct rated voltage outputted from said rectifying means, said smoothing means having a zenor diode and a smoothing capacitor, which are connected in parallel with each other between the live lines at a rear terminal of said rectifying means.

2. The circuit for converting a power supply as claimed in claim 1, further comprising an alternating power converting section for receiving the alternating current output from said snubber circuit, to form a path of positive and negative directions of the alternating power so that the received alternating current is converted into a constant level alternating current.

3. The circuit for converting a power supply as claimed in claim 2, wherein said alternating power converting section comprises first and second zenor diodes, which are connected in parallel in the reverse direction with each other between the live lines at a rear terminal of a pair of voltage dividing resistors, which are connected to divided live lines from said snubber circuit, and first and second current limiting resistors, which are serially connected between a subsequent live lines, to output a reference voltage at a junction point of the first and second current limiting resistors.

4. The circuit for converting a power supply as claimed in claim 2, wherein said alternating power converting section comprises a pair of voltage dividing resistors, which are connected to divided live lines from said snubber circuit, a first pair of zenor diodes comprised of first and second zenor diodes, and a second pair of zenor diodes comprised of third and fourth zenor diodes, the first pair of zenor diodes and the second pair of zenor diodes are connected in parallel with each other in a reverse direction between the live lines at a rear terminal of the voltage dividing resistors, a first junction point of the first and second zenor diodes and a second junction point of the third and fourth zenor diodes are commonly connected with each other so as to generate a reference voltage.

5. A circuit for converting a power supply, which comprises:

- a filter for filtering a commercial alternating current, said filter being connected to main transmission live lines of a commercial alternating current power, said filter having a choke coil;
- a power level adjusting means for receiving the filtered alternating current from said filter, to convert a power level of the received alternating current, said power level adjusting means having an current limiting capacitor and an adjusting resistor, which are connected in parallel to the live lines, and a discharging resistor serially connected to the capacitor and the resistor;
- a rectifying means for receiving the level-converted alternating current from said power level adjusting means, to convert the alternating current into a direct current having a constant level;
- a snubber circuit for receiving the direct current from said rectifying means, to eliminate abnormal voltage components of the direct current, said snubber circuit having a snubber capacitor and a snubber resistor, which are serially connected between the live lines; and
- a smoothing means for adjusting and smoothing a direct rated voltage outputted from said rectifying means, said smoothing means having a zenor diode and a smoothing capacitor, which are connected in parallel with each other between the live lines at a rear terminal of said rectifying means.

6. A circuit for converting a power supply, which comprising:

- a filter for filtering a commercial alternating current, said filter connected to main transmission live lines of a commercial alternating current power, said filter having a choke coil;
- a power level adjusting means for receiving the filtered alternating current from said filter, to convert a power level of the received alternating current, said power level adjusting means having an current limiting capacitor and an adjusting resistor, which are connected in parallel to the live lines and each other, and a discharging resistor serially connected to the current limiting capacitor and the adjusting resistor;
- a snubber circuit for receiving the power level converted alternating current from said power level adjusting means, to eliminate abnormal voltage components of the power level converted alternating current, said snubber circuit having a snubber capacitor and a snubber resistor, which are serially connected between the live lines; and
- an alternating power converting section for generating a reference voltage, said alternating power converting section comprising a first pair of zenor diodes comprised of first and second zenor diodes, and a second pair of zenor diodes comprised of third and fourth zenor diodes, the first pair of zenor diodes and the second pair of zenor diodes, which are connected in parallel with each other in the reverse direction between the live lines at a rear terminal of said snubber circuit, a first junction point of the first and second zenor diodes and a second junction point of the third and fourth zenor diodes being commonly connected to generate a reference voltage.

* * * * *